US010414960B2

(12) United States Patent
Elagin et al.

(10) Patent No.: US 10,414,960 B2
(45) Date of Patent: *Sep. 17, 2019

(54) SUBSTANCE FOR REMOVING OILS FROM SOIL AND HARD SURFACES, AND METHOD FOR USING SAID SUBSTANCES (VARIANTS)

(71) Applicant: Obshchestvo S Ogranichennoj Otvetstvennostyu "NPO Biomikrogeli", Ekaterinburg (RU)

(72) Inventors: Andrey Aleksandrovich Elagin, Ekaterinburg (RU); Maksim Anatolevich Mironov, Ekaterinburg (RU); Il'ya Dmitrievich Shulepov, Ekaterinburg (RU)

(73) Assignee: Obshchestvo S Ogranichennoj Otvetstvennostyu "NPO Biomikrogeli", Ekaterinburg (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/572,239

(22) PCT Filed: Dec. 8, 2015

(86) PCT No.: PCT/RU2015/000855
§ 371 (c)(1),
(2) Date: Nov. 7, 2017

(87) PCT Pub. No.: WO2016/178597
PCT Pub. Date: Nov. 10, 2016

(65) Prior Publication Data
US 2018/0118990 A1    May 3, 2018

(30) Foreign Application Priority Data
May 7, 2015  (RU) ................ 2015117416

(51) Int. Cl.
| C09K 3/32 | (2006.01) |
| B09C 1/00 | (2006.01) |
| C11D 3/22 | (2006.01) |
| B82Y 30/00 | (2011.01) |
| C09K 17/00 | (2006.01) |
| B09C 1/08 | (2006.01) |
| C11D 3/04 | (2006.01) |

(Continued)

(52) U.S. Cl.
CPC ............... *C09K 3/32* (2013.01); *B09C 1/00* (2013.01); *B09C 1/08* (2013.01); *B82Y 30/00* (2013.01);

(Continued)

(58) Field of Classification Search
CPC ........ C09K 3/32; C09K 17/00; C11D 17/003; C11D 3/044; C11D 3/222; C11D 3/28; B09C 1/00; B09C 1/08; B82Y 30/00
See application file for complete search history.

(56) References Cited

U.S. PATENT DOCUMENTS

| 5,338,561 A | * | 8/1994 | Campbell | ............. A23D 7/011 426/573 |
| 6,153,017 A |  | 11/2000 | Ward et al. | |
| 7,229,952 B2 |  | 6/2007 | Reddy et al. | |

FOREIGN PATENT DOCUMENTS

| RU | 94030825 | 10/1997 |
| RU | 2002129150 | 8/2004 |

(Continued)

OTHER PUBLICATIONS

Grem, Chitosan Microspheres Applied for Removal of Oil from Produced Water in the Oil Industry, Feb. 16, 2013, p. 1-3 (Year: 2013).*

(Continued)

*Primary Examiner* — Bobby Ramdhanie
*Assistant Examiner* — Donovan Bui-Huynh
(74) *Attorney, Agent, or Firm* — Preston Smirman; Smirman IP Law, PLLC

(57) ABSTRACT

The claimed group of inventions relates to the field of organic chemistry and can be used for removing oils, including petroleum, fuel oil, fuels, hydrocarbons and liquid fuel, from soil; and can also be used for processing and gathering petroleum, oils, fuel oil, fuels, hydrocarbons and other petroleum products from hard surfaces, for example, from the inner surfaces of tanks for storing petroleum or petroleum products, of equipment used during the recovery, re-processing and transportation of petroleum, of equipment used for producing petroleum products, drilling sludge, gravel or sand in storage facilities, or from other hard surfaces. The substance for removing oils, including petroleum and petroleum products, from soil and hard surfaces is in the form of an aqueous solution of a natural polysaccharide and a surfactant. Unlike the prototype, microgels of polysaccharides having a molecular mass of 20 000 to 200 000 daltons and a particle size of 10 to 1000 nm are used as a natural polysaccharide; furthermore, the overall concentration of the microgels of the polysaccharides and the surfactant in the aqueous solution is at least 0.05 g/l, while the ratio of the microgels of the polysaccharides to the surfactant is in the range of 100:1 to 1:100. The claimed group of inventions makes it possible to achieve an increase in the effectiveness of the removal of oils, including petroleum and petroleum products, from hard surfaces or soil; a decrease in the specific consumption of the reagents while simultaneously increasing the environmental safety of the process of removing oils from hard surfaces or soil, and providing for the possibility of re-using the oils removed from the soil and the hard surfaces, and also the surfactants.

12 Claims, No Drawings

(51) Int. Cl.
*C11D 3/28* (2006.01)
*C11D 17/00* (2006.01)
*C11D 1/14* (2006.01)
*C11D 1/62* (2006.01)

(52) U.S. Cl.
CPC .............. *C09K 17/00* (2013.01); *C11D 1/146* (2013.01); *C11D 1/62* (2013.01); *C11D 3/044* (2013.01); *C11D 3/222* (2013.01); *C11D 3/28* (2013.01); *C11D 17/003* (2013.01)

(56) References Cited

FOREIGN PATENT DOCUMENTS

| RU | 2301258 | 10/2006 |
| RU | 2011108189 | 9/2012 |
| RU | 2500490 | 12/2013 |
| RU | 2514645 | 4/2014 |
| RU | 2012142940 | 4/2014 |

OTHER PUBLICATIONS

Written Opinion of International Searching Authority dated Mar. 9, 2016.
Translation of International Search Report dated Mar. 24, 2016.
International Search Report dated Mar. 24, 2016.
International Preliminary Report on Patentability dated Feb. 1, 2017.
Translation of International Preliminary Report on Patentability dated Feb. 1, 2017.
Machine Translation of RU2002129150.

* cited by examiner

SUBSTANCE FOR REMOVING OILS FROM SOIL AND HARD SURFACES, AND METHOD FOR USING SAID SUBSTANCES (VARIANTS)

CROSS-REFERENCE TO RELATED APPLICATION

The instant application is a national phase of PCT International Application No. PCT/RU2015/000855, filed Dec. 8, 2015, and claims priority to Russian Patent Application Serial No. RU 2015117416, filed May 7, 2015, the entire specifications of both of which are expressly incorporated herein by reference.

This group of inventions relates to organic chemistry and can be used for removing different kind of oil, including petroleum, residual crude, fuel of different kinds, hydrocarbons, liquid fuel etc. and also for processing or gathering petroleum, oils, residual crude, fuel of different kinds, hydrocarbons and other petroleum products from hard surfaces, such as inner surfaces of storage tanks for oil or oil products, equipment used in oil extraction, processing or transportation, as well as for the production of petroleum products, bore mud, gravel, or sand in storage facilities, or from other hard surfaces.

Cleaning hard surfaces or soil off oil or petroleum products is important because contamination of surfaces and of soil results from numerous petroleum and oil boring, processing and transportation technologies. A good example of such surfaces are tanks for storage or transportation of petroleum products, industrial machinery that comes into contact with oil during various technological processes, oil-field equipment, contaminated with petroleum products, gravel along railway lines, contaminated sand, soil or ground, resulting from oil production. Traditionally, cleaning such surfaces is carried out using some surface-active compounds, oxidizing agents, individual alkalis or their combinations. There are also high-temperature methods, such as steam treatment or surface burning. A particular method or a combination of two or more methods can be used depending on the surface and its contaminant. However, although many such methods exist, the problem of cleaning hard surfaces or soil off various kinds of oil, including petroleum and its products cannot be considered fully solved because all the above methods produce toxic residue, hazardous for the environment, which need to be somehow utilised.

There exists a material for cleaning soil off oil or oil products, consisting of molasses and a surface-active substance within the concentration range of 10-40 mg/l kg of soil, while molasses are introduced in the quantity to obtain the final concentration of sugars 3-10 g/l kg of soil (Patent RU2301258, IPC C12N1/26, B09C1/10, 5 Apr. 2005).

There also exists a material for cleaning soil off oil or oil products, made of a polyvinylchloride-based sorbent; polystyrene, polypropylene, polyethylene, or co-polymers of the above in any molecular ratio and with 5-200 μm particle size being used as the sorbent (application for patent RU94030825, IPC E02B15/04, C/02F1/28, 18 Aug. 1994).

These inventors chose as the prototype for this invention the material for cleaning hard surfaces off oil or oil products consisting of an acid water solution that contained a polymer replaced with an amino group, a halogenation agent, and one or more surface-active substances. Chitosan is preferably used as a polymer replaced with an amino group, while the halogenation agent preferably represents a sodium hypochlorite. (U.S. Pat. No. 7,229,952B2, IPC C11D3/30, C02F1/52, C02F1/56, E21B43/22, 19 Dec. 2002).

There exists a method of cleaning soil off petroleum contamination, where a molasses-containing nutritive agent is introduced into the contaminated soil, stimulating development in the soil of oil-oxidizing bacteria, and also containing a surface-active substance of 10-40 mg/l kg of soil concentration, while molasses are introduced in the quantity to obtain the concentration of sugars 3-10 g/l kg of soil (Patent RU2301258, IPC C12N1/26, B09C1/10, 5 Apr. 2005).

There exists a method of cleaning hard soil of hydrocarbon contamination, which includes forming a suspension in water of a mixture of a hydrophobic adsorbent chosen from synthetic foams and the given soil in the presence of water, while the adsorbent has a lower density than that of water; the suspension is stirred and the adsorbent is gravity separated from the aquatic mixture. (U.S. Pat. No. 6,153,017A, IPC B09C1/02, C10G1/00, 29 Jan. 1998).

There is an oil or oil products sorption method off the surface of water or soil, which includes spraying a polyvinylchloride-based sorbent on the surface of water or soil, followed by collecting oil, and the effect of this treatment is boosted by using a sorbent consisting of polystyrene, polypropylene, polyethylene, or co-polymers of the above in any molecular ratio and with 5-200 μm particle size (application for patent RU94030825, IPC E02B15/04, C02F1/28, 18 Aug. 1994).

There is a method of surface cleaning off oil or oil products, which includes treating the surface with a disperse polymer-containing composite material, followed by recovery or utilisation of the spent product, where the polymer represents latex of either natural or butadiene-styrene rubber, applied to the surface of an inert filler, different in that the filler represents a material with a highly developed specific surface, produced by foaming the original material directly before the polymer is applied, and coating the filler with a polymer is carried out under low pressure: 0.9 atm to 1*10−4 atm (application for invention RU2011108189, IPC E02B15/04, C02F1/28, C09K3/32, B01J20/32, 2 Mar. 2011).

There is a method of cleaning hard surfaces from contamination with oil or oil products, which included blasting hard surfaces with jets of cleaning liquid, followed by phase separation of contaminated cleaning liquid; while the cleaning liquid represents a 1-15% water dispersion of monodisperse solid particles in the form of polystyrene microspheres or mineral particles of 0.2-6.0 μm in size, the surface of which has been modified with silicon surface-active material and maximum two-dimensional pressure of 2D films formed from them, 12-18 mN/m, and phase separation of the contaminated cleaning liquid is carried out, using an water solution of an electrolyte (Patent RU2500490, IPC B08B3/08, 29 Jun. 2012).

The nearest method to the new cleaning method is the method of cleaning solid surfaces off oil and oil products by treating them with admixtures, which include an acid water solution, containing a polymer replaced with an amino group, a halogenation agent and at least one surface-active substance. Chitosan is preferable as a polymer replaced with an amino group, while a sodium hypochlorite solution is the preferable halogenation agent (U.S. Pat. No. 7,229,952B2, IPC C11D3/30, C02F1/52, C02F1/56, E21B43/22, 19 Dec. 2002). This method was chosen as a prototype.

The drawbacks typical of all the known methods and materials used for cleaning soils or had surfaces off oil and oil products is high consumption rate of reagents as well as their low oil-removal efficiency and the inability to recover and recycle either the oil and oil products removed from hard surfaces during the cleaning process or the cleaning compositions as such.

The drawback of the prototype is the use of polysaccharides which are not surface-active substances, which blows up their consumption rate and reduces their oil-cleaning capacity.

The technological problem that this group of inventions aims to solve is to raise efficiency of cleaning soil or hard surfaces off various kinds of oil, including petroleum and petroleum products and improve ecological safety of the soil or hard surface cleaning process and facilitate recycling of the removed oils and surface-active materials.

The technological result that this group of inventions aims to achieve includes improved oil-cleaning properties, decrease consumption rate of reagents used in the process of cleaning soil or hard surfaces off oil, including petroleum and petroleum products, while improving ecological safety of the process and enabling recycling of the oils removed from soil or hard surfaces and of surface-active agents.

The new material represents the following.

A product for cleaning soil or hard surfaces in the form of a water solution of natural polysaccharide and a surface-active substance. Unlike the prototype, the natural polysaccharide used represents microgels of polysaccharides with molecular mass between 20,000-200,000 D and with particle size of 50-600 nm, and the total concentration of polysaccharide microgels and the surface-active agent in the water solution is at least 0.2 g/l, while the ratio of polysaccharide microgels to the surface-active agent varies in the 10:1-1:10 range.

The new method of cleaning soil off oils, including petroleum and petroleum products, represents the following.

Soil particles are treated with a product in the form of a water solution of a natural polysaccharide and a surface-active agent, then the product of that interaction between the agent and oil is collected. Unlike the prototype, the first step is collecting the soil and immersing it in the reagent, while polysaccharide microgels of molecular mass of 20,000-200,000 and 50-600 nm are used as natural polysaccharide, while the total concentration of polysaccharide microgels and the surface-active agent in the water solution is at least 0.2 g/l, while the ratio of polysaccharide microgels to the surface-active agent varies in the 10:1 to 1:10 range.

Additionally, either prior to immersing the soil in the reagent or while the soil is immersed, it can be ground, preferably mechanically, to the particle size of no more than 50 mm. To grind the soil prior to its immersion in the reagent, a worm, a crusher, a grater, a mill or any other grinding machinery can be used. The soil that is already immersed can be ground using a stirrer, a worm, a mill or other means.

The method of cleaning hard surfaces off oil, including petroleum and petroleum products is as follows.

Hard surfaces are treated with a water solution of natural polysaccharide and a surface-active agent, then the product of reaction between the reagent and oil is collected. Unlike the prototype, the natural polysaccharide represents microgels of polysaccharides with molecular mass of 20,000-200,000 D and with particle size of 50-600 nm, while the total concentration of polysaccharide microgels and the surface-active agent in the solution is at least 0.2 g/l, while the ratio between the microgels and the surface-active agent varies in the 10:1-1:10 range.

Polysaccharide microgels represent branched polymer colloid particles of 0.01-1 μm diameter that swell in solvents due to electrostatic or steric repulsion forces between the charged groups. They form due to either directional polymerisation of monomers or pH-initiated neutralisation of solutions of either synthetic or natural polymers carrying carboxyl or amino groups. Polysaccharide microgels, used in these inventions may represent colloid solutions of natural polysaccharides: low-substituted (<40%) carboxylmethyl cellulose and its salts with aliphatic amines (butylamine, benzylamine, ethylendiamine, hexamethylendiamine); chitosan of 90-97% diacetylation; pectin substances with carboxyl and/or amino groups and with residual (<25%) methoxyl groups, as well as other polysaccharide microgels. Molecular mass of the products can vary in the 20,000-200,000 D, while high-molecular (>200,000 D) and low-molecular (<20,000 D) derivatives of polysaccharides cannot be used in these inventions. To produce polysaccharide microgels that would be sufficiently stable over a long period of time, polysaccharide polymer chains are cross-linked with the use of anhydrides or activated ethers of dicarboxylic acids, di-isocyanides, di-isocyanates or other cross-linking agents. Diameter of chemically cross-linked polysaccharide microgel particles should vary, preferably, within the 50-600 nm range. The polysaccharide microgels used in this group of inventions can be produced by physical association of chemical cross-linking. Experiment showed that the lowest concentration of polysaccharide microgels in a water solution should be at least 0.025 g/l, preferably at least 0.1 g/l. Although higher concentrations produce a greater effect, their consumption is greater. Best to have polysaccharide microgel concentration under 10 g/l, to avoid increasing viscosity of the working solutions, which would have a negative effect on penetration of the solution into the pores of the material treated, which would result in deterioration of its cleaning capacity.

Polysaccharide microgels have strong affinity to interface surfaces; they form monolayers on the surface of solid bodies, such as particles of soil, metals, silicates, plastics and other materials; they also can encapsulate organic solvents (benzene, toluene, chlorohydrocarbons), petroleum, petroleum products, vegetable and animal oils and fats.

Surface-active agents used in this group of inventions can represent various (used in industry) nonionic, anion or cation surface-active agents. Surface-active agents used in this group of inventions were selected in such a fashion that their reaction with polysaccharide microgels would produce no insoluble precipitation. In combination with carboxymethylcellulose-based microgels or pectin-based microgels containing a carboxyl group it is best to use anion surface-active agents, while in the case of chitosan-based or pectin-based microgels containing an amino group, cation surface-active agents are preferable. The lowest concentration of the surface active agent in the working solution must be such as to assure a substantial reduction of surface tension at the phase interfaces on the treated surface or on a particle of soil. Experiments indicated that most surface-active agents reach that result at the concentration of at least 0.025 g/l, while the best results are achieved at the concentration of at least 0.1 g/l. Concentration of the surface-active agent in the solution should not exceed 50 g/l because higher concentrations result in unreasonably high consumption.

Substances that can be used as surface-active agents include sodium laurilsulphate and other sulfurized fatty spirits, sodium stearate and other salts of fatty acids, cetylpyridinium chloride and other quaternary salts, polyethylene glycol acetyl ether, sugars and phenols.

Total concentration of polysaccharide microgels and the surface-active agent in water solution should—preferably—be at least 0.2 g/l: this would improve effectiveness of oil removal.

The ratio between polysaccharide microgels and the surface-active agent in the water solution must vary within the 10:1 to 1:10 range. The lower limit of this ratio is chosen because an excess of the microgel reduces mobility of oil drops, which might make their removal from porous bodies, soil particles for example, impossible. The upper boundary of the ratio is chosen because excessive presence of a surface-active agent results in substantial secondary contamination of the hard surface or soil particles.

The use of polysaccharide microgels makes it possible to reduce secondary precipitation of oil drops on the surface to a minimal value thanks to hydrophilisation of the surface. Hydrophilisation of the surface results from the monolayer of polysaccharide microgel particles forming on the surface. Capsulation of oil drops results from precipitation of the polysaccharide microgel on the oil/water phase boundary. These processes help to reduce consumption of surface-active agents.

A mixture of polysaccharide microgels and surface-active agent forms a stable foam, which facilitates its application to the hard surface or to the surface of soil particles. When the solution spreads on the surface, oil drops are removed, while the surface becomes hydrophilised. Consequently, the use of a mixture of polysaccharide microgel and a surface-active agent produces a synergetic effect. Surface-active agents have high affinity to the phase interface and reduce surface tension at the water/oil interface; on the other hand, polysaccharide microgels have high affinity to oils, producing a viscous film on their surface. On the other hand, these processes produce stable oil drops, which can be separated from hard surfaces and soil particles. The use of polysaccharide microgels alone or of surface-active agents alone is less effective because the application of polysaccharide microgels produces films that reduce mobility of oil drops, especially in porous substrates. On the other hand, the application of surface-active agents without polysaccharide microgels produces their high consumption due to secondary precipitation of oil on the substrate.

Improvement of oil-removing properties of an oil-cleaning product, used for cleaning soil or hard surfaces off oil, and the reduction of its specific consumption improves effectiveness of the cleaning of soil or hard surfaces off oil, including petroleum and petroleum products.

Reagents in all the methods used in these inventions are applied to the surface of soil particles or to hard surfaces in the form of either a water solution or foam, either manually or using a special device (a hose nozzle or a sprayer). Oil drops float up to the surface of the solution and are carried away with its flow. Separation of oil emulsion from water is done, using any available method, such as sedimentation or centrifugation. Recovery of oil is carried out by breaking the emulsion, adding a polymer of an opposite sign, for example polyamines in the case of microgels containing a carboxyl group, or polyacids in the case of microgels containing amino groups. In some cases sedimentation is carried out by adding polycations of an opposite sign, such as aluminum or calcium salts. When the emulsion has been broken down, oil is separated by sedimentation, centrifugation or mechanically wringing out films of gel, depending on the reagent/oil ratio in the emulsion. Thus, this group of inventions for cleaning soil or hard surfaces from oils, including petroleum and petroleum products, ensures that the surface-active agents and oils removed from the soil or hard surfaces can be recycled, which makes the cleaning of soil or hard surfaces ecologically safer.

Comparison of this group of inventions with existing methods shows that it satisfies the criterion called "novelty of an invention".

Neither polysaccharide microgels nor their mixtures with surface-active agents have been previously used for cleaning hard surfaces or soil from oil. Using surface-active agents in combination with polysaccharide microgels makes cleaning more effective because the surfaces treated undergo waterproofing and because oil is encapsulated simultaneously.

The above suggests that this group of inventions satisfies the criterion called "inventive step".

This group of inventions can be used under real-life conditions, using known means and operations. This proves that this group of inventions satisfies the criterion called "industrial application".

This group of inventions can be illustrated with the following concrete examples.

EXAMPLE 1 (IN ACCORDANCE WITH THE PRESENT INVENTION)

Residual crude is removed from the surface of a steel tank, using a solution containing a mixture of chitosan-based physically associated microgel and a cation surface-active agent.

Chitosan (1 g) of 95% deacetylation level and molecular weight of 60,000-100,000 D was dissolved in 1 l of 0.01 M hydrochloric acid. A 0.05 M solution of sodium hydroxide was added to that solution until it reached pH=7.5. A cation surface-active agent: cetylpyridinium chloride (5 g/l) was introduced into this suspension of chitosan microgel, and the resulting solution was used to remove residual crude from the inner surface of the steel tank. The steel tank of 25 l capacity is used for storing oil products.

0.5 l of that solution was introduced into that steel tank and stirred vigorously. A monolayer of polysaccharide microgel particles formed on the treated surface, and the polysaccharide microgel precipitated on the oil/water interface, while oil drops floated up to the surface of the solution and were carried away with its flow. To recover the oil emulsion, a 5% solution of polyacrylic acid was added, and the precipitate that formed was filtered off and wringed out in a mechanical press to extract residual crude, while the water solution of the surface-active agent stayed in the tank. Effectiveness of residual crude extraction (the ratio of the quantity of the final product to the original product applied to the hard surface) amounted to 98%.

EXAMPLE 2 (IN ACCORDANCE WITH THE PRESENT INVENTION)

A spill of raw petroleum on the surface of water was eliminated with the use of a solution of a physically associated microgel based on carboxymethyl cellulose salts and an anion surface-active agent.

A sodium salt of carboxymethyl cellulose (20 g) with carboxymethyl group substitution level of 25-30% and molecular weight of 30,000-50,000 D was dissolved in 1 l of water. A concentrated solution of hydrochloric acid was added to that solution until an acid reaction: pH=3-4. This solution of carboxymethyl cellulose of 2 mass % concentration was diluted tenfold with water, then 50 g of an anion surface-active agent—sodium lauryl sulphate—was added, and the resulting solution was used to clean soil off oil. The surface layer of soil was removed and ground till its particles measured less than 5 mm. The preheated to 80° C. solution was poured over the ground soil. A monolayer of polysaccharide microgels formed on the surface to be cleaned, then polysaccharide microgel precipitated on the oil/water interface. Oil drops floated up to the surface of the solution. The top layer of the solution with drops of oil was poured off and passed on to be recycled. To recycle the oil emulsion, a 5% solution of polyhexamethylenguanidine was added to it, the precipitate was filtered off and wringed out in a mechanical press to extract oil. Efficiency of oil extraction amounted to 72%. The remaining solution of the surface-active agent could then be recycled.

EXAMPLE 3 (IN ACCORDANCE WITH THE PRESENT INVENTION)

Removing toluene from the surface of sand, using a solution of a chemically bonded pectin-based microgel and non-ionic surface active agent.

Pectin (5 g) with methoxylation level of 1-5% and molecular weight of 40,000-100,000 D was dissolved in 1 l of sodium hydroxide solution (2 g/l). 2 g of hydrochloride of benzylamine and 200 mg of di-isocyanopropylpiperazine were added to that solution. When these are fully dissolved, 3 ml of formalin were added to the solution and it was left for 2 h, continuously and vigorously stirred. Then this solution of 0.5% concentration was acidified to pH 7 before adding 15 g of non-ionogenic surface-active agent: oxyethylated phenol Igepal SO520. This solution was then used for cleaning sand off toluene. This was achieved by pouring the solution over the contaminated sand, stirring it vigorously and continuously for 5 min, then filtering it off and sending away for recovery. A monolayer of polysaccharide microgel particles formed on the treated surface, while polysaccharide microgel precipitated on the oil/water interface. Oil drops floated up to the surface of the solution, and were removed from there with a fine-mesh sieve. The oil emulsion was recovered by adding 1% solution of calcium chloride solution. The precipitate was filtered off and wringed out using a mechanical press—to extract toluene. Effectiveness of toluene recovery amounted to 88%. The remaining solution was suitable for recycling.

EXAMPLE 4 (IN ACCORDANCE WITH THE PRESENT INVENTION)

Removing diesel oil based on rape-seed oil off the surface of soil, using a solution of physically associated pectin-based microgel and an anion surface-active agent.

Pectin hydrazide (20 g), substitution level of 25-40% and molecular weight of 40,000-100,000 D, was dissolved in 1 l of sodium hydroxide (5 g/l). 2 g of an anion surface-active agent in the form of sodium stearate was added. This solution was used for cleaning soil off diesel fuel based on rap-seed oil. The top layer of soil was ground to a particle size of less than 5 mm, and this solution was poured over the sand at room temperature, held for 20 min under vigorous stirring, filtered and used for recycling. Stirring was accompanied with formation of a monolayer of polysaccharide microgel particles on the oil/water interface on the treated surface. Oil drops floated up to the surface of the solution where they were skimmed off for recycling. Recycling of the oil emulsion included introduction of 1% calcium chloride solution to the emulsion; then the precipitate was filtered off and wrung in a mechanical press to extract diesel fuel. Effectiveness of diesel fuel extraction amounted to 82%. The remaining solution of the surface-active agent was suitable for recycling.

This group of inventions can make cleaning hard surfaces or soil off oil, including petroleum and petroleum products, reducing specific consumption of reagents, while improving ecological safety of the cleaning process of and facilitating recycling of oil removed from soil or hard surfaces as well as of surface-active agents.

The invention claimed is:

1. A composition in the form of a water solution for collecting oil or oil products from soil or hard surfaces, comprising:
    a surface-active agent;
        polysaccharide microgels having a molecular mass of 20,000 to 200,000 Daltons and a particle size of 50 to 600 nm, wherein a total concentration of the polysaccharide microgels and the surface-active agent in the water solution is at least 0.2 g/l, wherein a ratio of the polysaccharide microgels to the surface-active agent varies within a range of 10:1 to 1:10, wherein the polysaccharide microgels are operable to interact with the oil or oil products to produce a collectable product.

2. The composition in accordance with claim 1, wherein the polysaccharide microgels include carboxymethyl cellulose, wherein the surface-active agent includes an anion surface-active agent.

3. The composition in accordance with claim 1, wherein the polysaccharide microgels include pectin materials that contain a carboxyl group, wherein the surface-active agent includes an anion surface-active agent.

4. The composition in accordance with claim 1, wherein the polysaccharide microgels are chitosan-based microgels, wherein the surface-active agent includes a cation surface-active agent.

5. The composition in accordance with claim 1, wherein the polysaccharide microgels are pectin-based microgels that contain an amino group, wherein the surface-active agent includes a cation surface-active agent.

6. A method for collecting oil or oil products from soil, comprising the steps of:
    collecting an amount of soil;
    treating the soil by immersing the soil in a reagent to produce a reaction product, wherein the reagent includes a water solution of a polysaccharide and a surface-active agent; and
    collecting the reaction product from the soil;
    wherein the polysaccharide used includes polysaccharide microgels of a molecular mass within a 20,000-200,000 Dalton range and a particle size within a 50-600 nm range;
    wherein a total concentration of the polysaccharide microgels and the surface-active agent in the water solution is at least 0.2 g/l, and the ratio of the polysaccharide microgels to the surface-active agent varies between 10:1-1:10.

7. The method according to claim 6, wherein either prior to immersing the soil, or while the soil is immersed, the soil is mechanically ground so that particles contained therein are no more than 50 mm in size.

8. A method for collecting oil or oil products from hard surfaces; comprising the steps of:
- treating a hard surface with a reagent to produce a reaction product, wherein the reagent includes a water solution of a polysaccharide and surface-active agent;
- collecting the reaction product from the hard surface;
- wherein the polysaccharide includes polysaccharide microgels of a molecular mass of 20,000-200,000 Dalton and particle size in the 50-600 nm range;
- wherein a total concentration of polysaccharide microgels and the surface-active agent in the water solution is at least 0.2 g/l;
- wherein a ratio between the polysaccharide microgels and the surface-active agent varies in the range of 10:1-1:10.

9. The method according to claim 8, wherein the polysaccharide microgel includes microgels based on carboxymethyl cellulose, wherein the surface-active agent includes an anion surface-active agent.

10. The method according to claim 8, wherein the polysaccharide microgel includes pectin-based polysaccharide microgels that contain a carboxyl group, wherein the surface-active agent includes an anion surface-active agent.

11. The method according to claim 8, wherein the polysaccharide microgel includes chitosan-based microgels, wherein the surface active agent includes a cation surface-active agent.

12. The method according to claim 8, wherein the polysaccharide microgel includes microgels based on pectin substances containing an amino group, wherein the surface-active agent includes a cation surface-active agent.

* * * * *